(12) United States Patent
Hayashi

(10) Patent No.: US 8,335,036 B2
(45) Date of Patent: Dec. 18, 2012

(54) ILLUMINATION OPTICAL SYSTEM FOR MICROSCOPE, AND MICROSCOPE

(75) Inventor: Kazuhiro Hayashi, Tokyo (JP)

(73) Assignee: Olympus Corporation, Tokyo (JP)

( * ) Notice: Subject to any disclaimer, the term of this patent is extended or adjusted under 35 U.S.C. 154(b) by 421 days.

(21) Appl. No.: 12/687,296

(22) Filed: Jan. 14, 2010

(65) Prior Publication Data

US 2010/0182680 A1    Jul. 22, 2010

(30) Foreign Application Priority Data

Jan. 21, 2009  (JP) ................................. 2009-010801

(51) Int. Cl.
*G02B 21/06* (2006.01)
(52) U.S. Cl. ........................................ 359/385; 359/368
(58) Field of Classification Search ................... 359/362, 359/363, 368, 369, 385, 387–390, 421–422, 359/599, 613, 642, 656, 661, 782, 783, 785, 359/794, 811; 362/355
See application file for complete search history.

(56) References Cited

U.S. PATENT DOCUMENTS

| | | | | |
|---|---|---|---|---|
| 4,397,529 A | * | 8/1983 | Taira | 359/381 |
| 5,050,970 A | * | 9/1991 | Kittaka | 359/653 |
| 5,153,779 A | * | 10/1992 | Ohashi | 359/770 |
| 5,173,809 A | * | 12/1992 | Iwaki et al. | 359/784 |
| 5,703,714 A | * | 12/1997 | Kojima | 359/368 |
| 6,507,434 B2 | * | 1/2003 | Miyashita | 359/387 |
| 7,133,199 B2 | * | 11/2006 | Hayashi | 359/385 |
| 7,227,696 B1 | * | 6/2007 | Nanba | 359/682 |
| 7,411,746 B2 | * | 8/2008 | Kato et al. | 359/770 |
| 7,443,578 B2 | * | 10/2008 | Yamazaki et al. | 359/387 |
| 8,027,085 B2 | * | 9/2011 | Chong | 359/385 |
| 8,040,597 B2 | * | 10/2011 | Sasaki | 359/388 |

FOREIGN PATENT DOCUMENTS

| | | |
|---|---|---|
| JP | 05-134190 A | 5/1993 |
| JP | 06-222270 A | 8/1994 |
| JP | 08-101344 A | 4/1996 |

* cited by examiner

*Primary Examiner* — Stephone Allen
*Assistant Examiner* — Jyotsna Dabbi
(74) *Attorney, Agent, or Firm* — Holtz, Holtz, Goodman & Chick, PC

(57) ABSTRACT

An illumination optical system includes, in order from a light source side a collector lens, a field stop, a field lens having positive power, an aperture stop, and a collective lens having positive power. The illumination optical system is a substantially both-side telecentric optical system between the field stop and a sample surface, and satisfies the following conditional expressions where $D_{FS}$ indicates a diameter of the field stop, $\beta$ indicates a magnification from the sample surface to the field stop, and NA indicates a numerical aperture on the sample surface side of the illumination optical system.

$$15 \geq D_{FS}/\beta \geq 9 \quad (1)$$

$$0.85 \geq NA \geq 0.5 \quad (2)$$

10 Claims, 10 Drawing Sheets

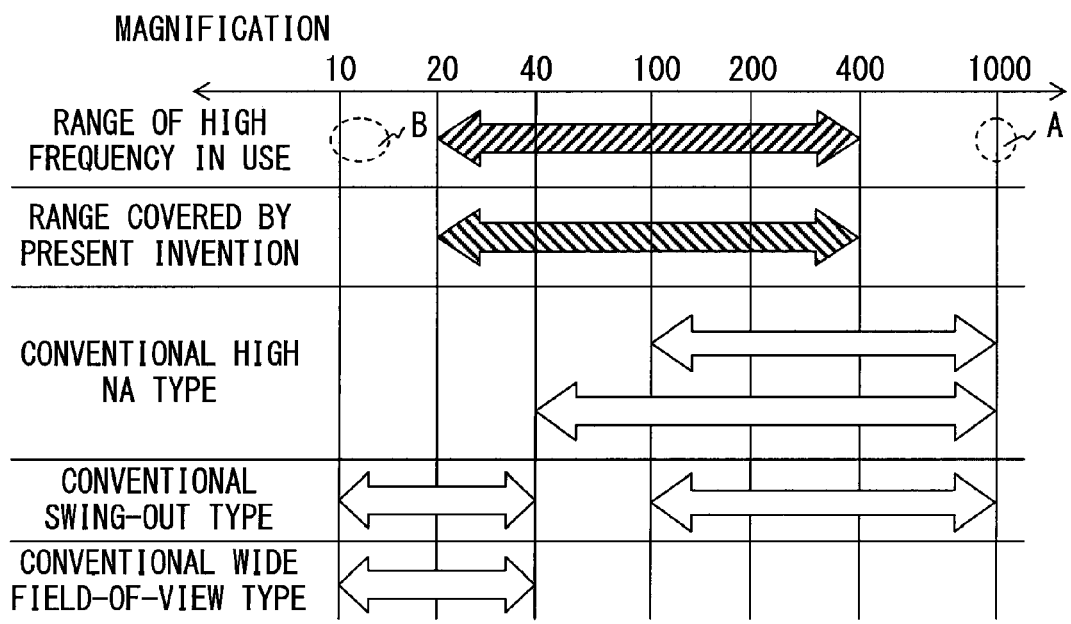
F I G. 1

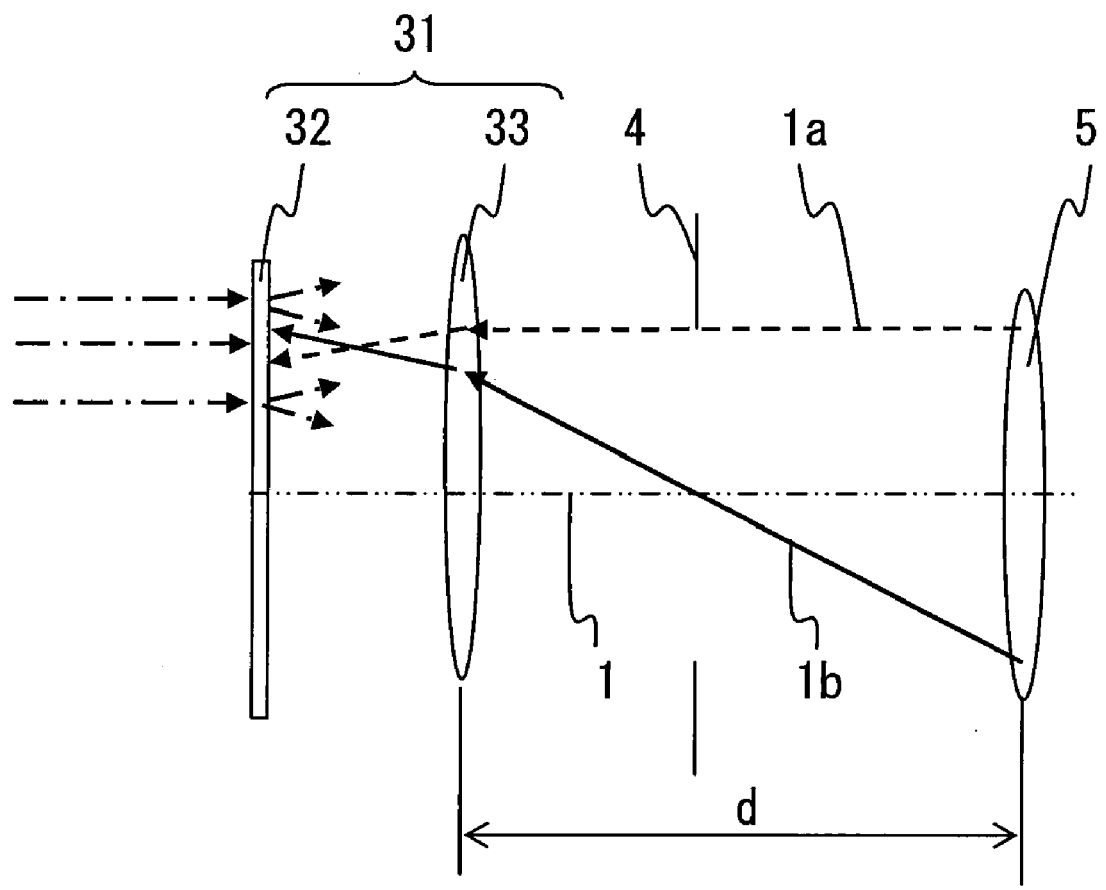
F I G. 7

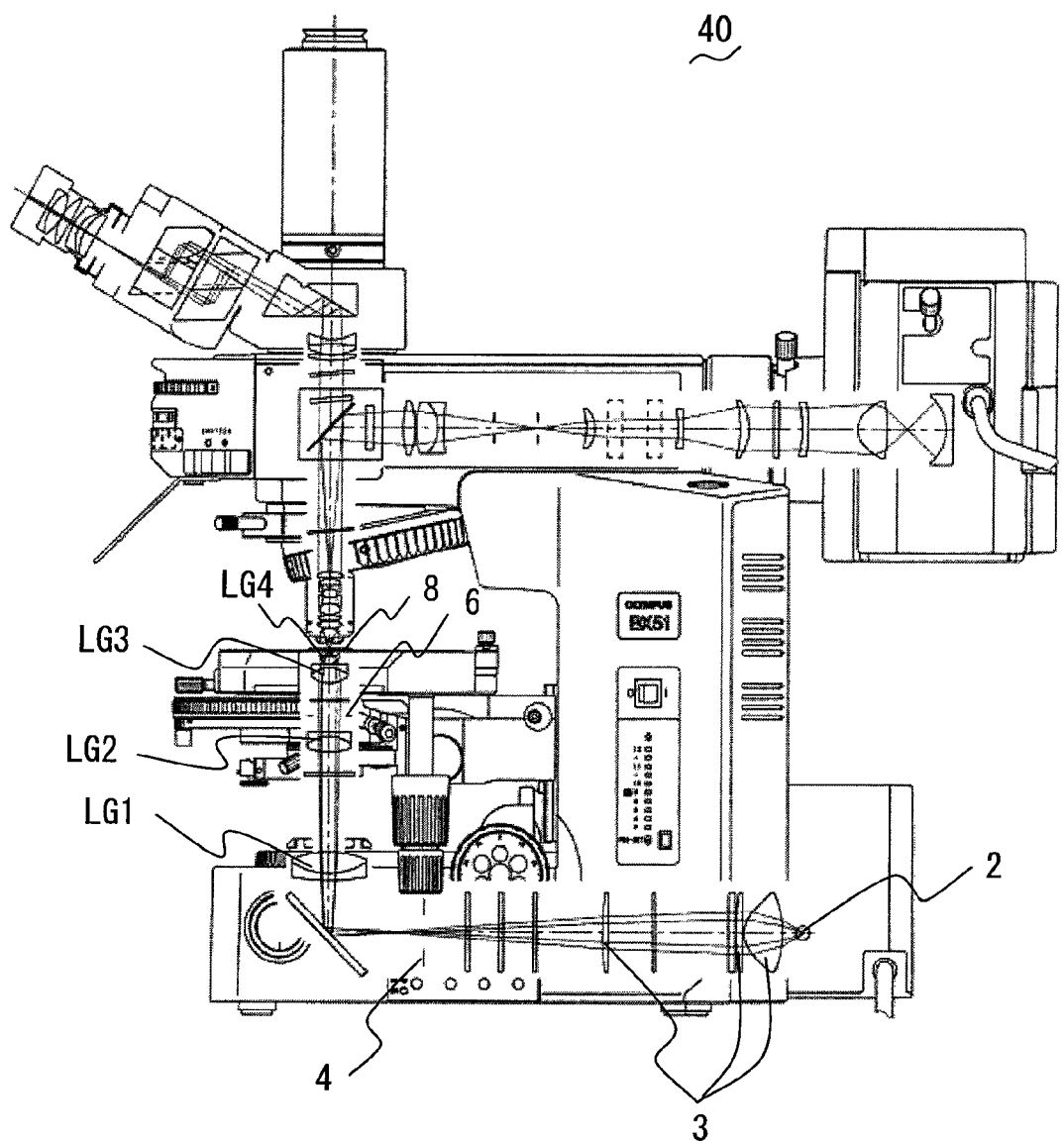
F I G. 10

ILLUMINATION OPTICAL SYSTEM FOR MICROSCOPE, AND MICROSCOPE

CROSS REFERENCE TO RELATED APPLICATIONS

This application is based upon and claims the benefit of priority from the prior Japanese Patent Application No. 2009-010801, filed Jan. 21, 2009, the entire contents of which are incorporated herein by this reference.

BACKGROUND OF THE INVENTION

1. Field of the Invention

The present invention relates to an illumination optical system for a microscope, and more specifically to an illumination optical system used in an observation in various magnifications.

2. Description of the Related Art

The magnification of a microscope used in an observation can be set in a wide range, and various functions may be demanded for an illumination optical system correspondingly. Generally, since an observation range is wider under lower magnification, the illumination optical system requires a function of illuminating a wider illumination range. On the other hand, an observation range is narrower under high magnification, but high resolution is needed. Therefore, the illumination optical system requires a high numerical aperture (NA). Thus, since the required function of the illumination optical system differs between an observation under high magnification and an observation under low magnification, the magnification of a microscope suitable for use is predetermined.

FIG. 1 is a conceptual drawing of an example of types of illumination optical system and a magnification appropriate for each type. As exemplified in FIG. 1, an illumination optical system can be designed and put to practical use as an illumination optical system of high NA type appropriate for an observation under high magnification, an illumination optical system of wide field-of-view type appropriate for an observation under low magnification, an illumination optical system of so-called swing-out type capable of switching between an illumination condition appropriate for high magnification and an illumination condition appropriate for low magnification by attaching/detaching a part of lenses of the illumination optical system, etc.

By exchanging between the above-mentioned illumination optical system of high NA type and illumination optical system of wide field-of-view type, or by a swing-out operation of attaching and detaching a part of lenses in the illumination optical system of swing-out type, an illumination environment can be optimized depending on the observation magnification. For example, the Japanese Laid-open Patent Publication No. H5-134190 and the Japanese Laid-open Patent Publication No. H8-101344 disclose the illumination optical system of swing-out type.

As described above, the conventional illumination optical system can optimize the illumination environment depending on the observation magnification. On the other hand, for example, when an observation is continued with the observation magnification changed from a low magnification (for example, lower than 40× magnification) to a high magnification (for example, 40× magnification or higher), the operation of the illumination optical system is required in addition to the operation of the observation optical system such as exchanging objectives etc. It is also required when the illumination optical system of swing-out type is used, thereby imposing a load on the user of the microscope.

For example, an immersion objective is used in an observation under high magnification exceeding 400× magnification (for example, 1000× magnification). However, after the immersion objective is used, oil etc. remaining on a sample is to be wiped off the sample. Since such an additional operation is required, the frequency in use of high magnification (range A) with the immersion objective is not so high. In addition, under very low magnification (for example, 10× magnification), it is often hard to specify an observation point by screening. Therefore, there is few opportunities to use the very low magnification (range B), and the frequency in use is low. Thus, the observation magnification of a microscope includes both the magnification that frequency in use is high and the magnification that frequency in use is low.

SUMMARY OF THE INVENTION

An aspect of the present invention provides an illumination optical system which includes, in order from the light source side, a collector lens, a field stop, a field lens having positive power, an aperture stop, and a collective lens having positive power, can be a substantially both-side telecentric optical system between the field stop and a sample surface, and satisfies the following conditional expression where $D_{FS}$ indicates the diameter of the field stop, $\beta$ indicates a magnification from the sample surface to the field stop, and NA indicates the numerical aperture on the sample surface side of the illumination optical system.

$$15 \geq D_{FS}/\beta \geq 9 \quad (1)$$

$$0.8 \geq NA \geq 0.5 \quad (2)$$

Another aspect of the present invention provides a microscope which includes an illumination optical system, and a light source for emitting light to the illumination optical system in which the illumination optical system includes, as described in order from the light source side, a collector lens, a field stop, a field lens having positive power, an aperture stop, and a collective lens having positive power, can be a substantially both-side telecentric optical system between the field stop and a sample surface, and satisfies the following conditional expression where $D_{FS}$ indicates the diameter of the field stop, $\beta$ indicates a magnification from the sample surface to the field stop, and NA indicates the numerical aperture on the sample surface side of the illumination optical system.

$$15 \geq D_{FS}/\beta \geq 9 \quad (1)$$

$$0.8 \geq NA \geq 0.5 \quad (2)$$

BRIEF DESCRIPTION OF THE DRAWINGS

The present invention will be more apparent from the following detailed description when the accompanying drawings are referenced.

FIG. 1 is a conceptual drawing of an example of types of illumination optical system and a magnification appropriate for each type;

FIG. 7 is a conceptual drawing for explanation of the effect of the optical element exemplified in FIG. 5;

FIG. 10 exemplifies the configuration of the microscope provided with the illumination optical system according to an embodiment of the present invention.

DESCRIPTION OF THE PREFERRED EMBODIMENTS

Each of the embodiments of the present invention is described below in detail with reference to the attached drawings.

Embodiment 1

Figure 2:
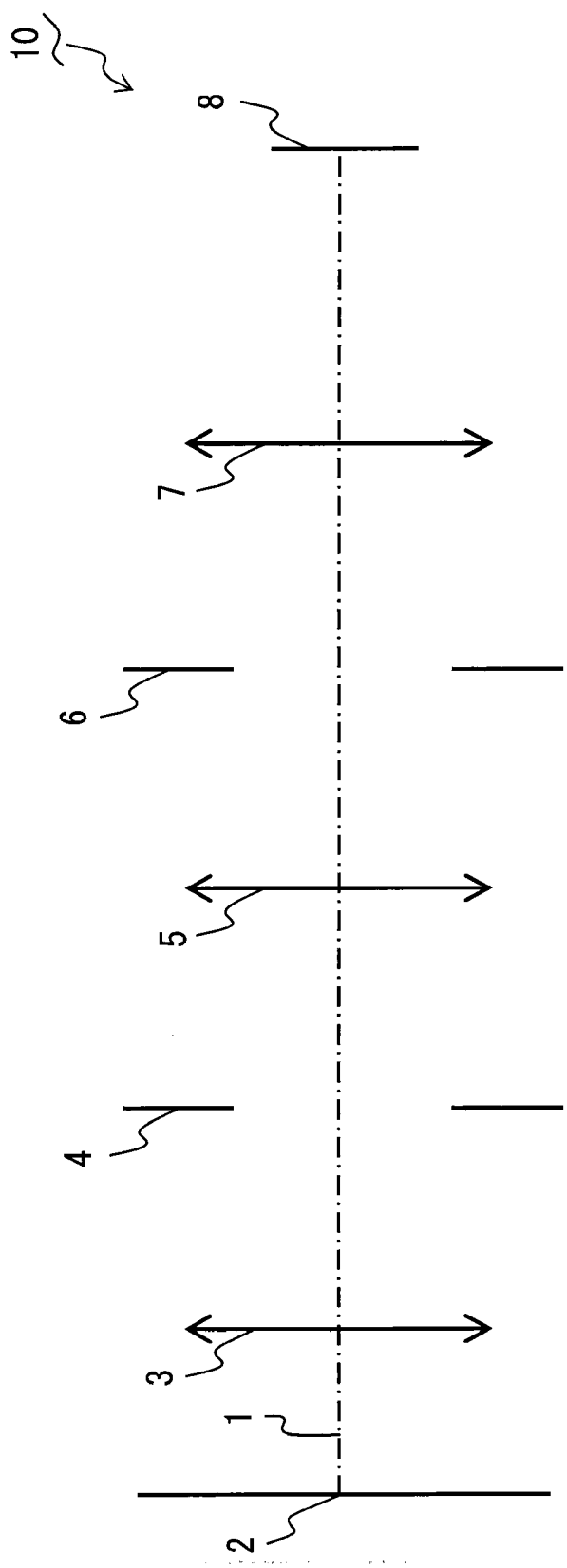
FIG. 2 illustrates the schematic view of an example of the entire configuration of the illumination optical system according to an embodiment of the present invention.

FIG. 2 illustrates the schematic view of an example of the entire configuration of the illumination optical system according to the present embodiment.

An illumination optical system 10 according to the present embodiment is a transmission illumination optical system, and is configured by, in order from the light source side of an optical axis 1 toward a sample surface 8, a light source 2, a collector lens 3, a field stop (FS) 4, a field lens 5, an aperture stop (AS) 6, and a collective lens 7.

The light from the light source 2 is collimated by the collector lens 3, and enters the field lens 5 through the field stop 4. Then, the light incident on the field lens 5 enters the collective lens 7 through the aperture stop 6, and illuminates the sample surface 8. The illumination optical system 10 is configured as a substantially both-side telecentric optical system from the field stop 4 to the sample surface 8. That is, the principal ray of the light incident on the field stop 4 and the principal ray of the light incident on the sample surface 8 are substantially parallel to the optical axis 1. Therefore, the field lens 5 and the collective lens 7 have positive power, respectively, and the focal point of the field lens 5 and the focal point of the collective lens 7 are positioned on the aperture stop 6 between the field lens 5 and the collective lens 7. Unless the optical characteristics are largely degraded, it is not necessary to strictly maintain the telecentricity from the field stop 4 to the sample surface 8.

Figure 3:
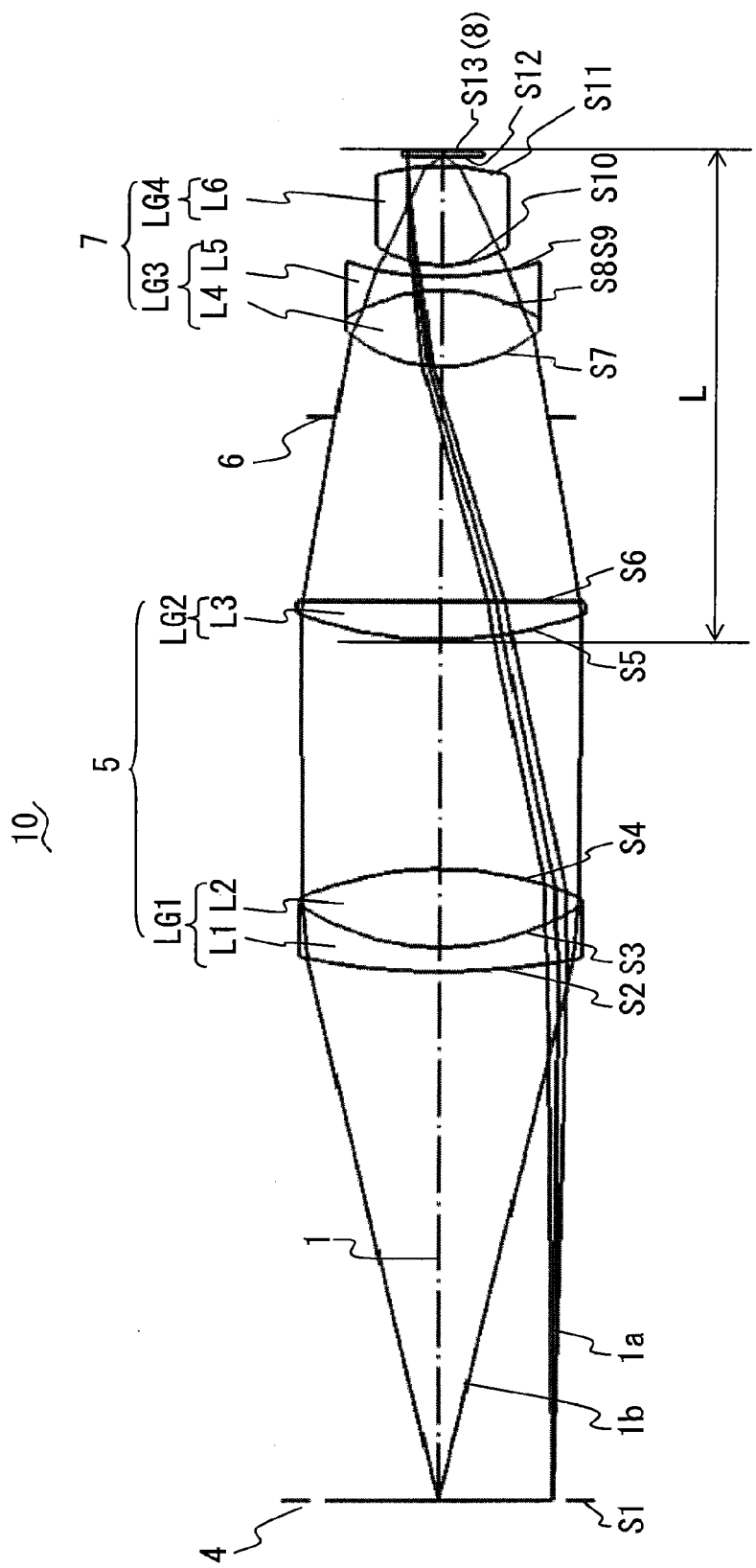
FIG. 3 exemplifies the configuration of the lens of the illumination optical system according to an embodiment of the present invention.

FIG. 3 exemplifies the configuration of the lens of the illumination optical system according to the present embodiment. FIG. 3 exemplifies the configuration between the field stop 4 and the sample surface 8.

As exemplified in FIG. 3, the field lens 5 of the illumination optical system 10 of the present embodiment is configured by two lens groups (lens groups LG1 and LG2) having positive power, respectively, and the light beam between the lens groups LG1 and LG2 is an afocal light beam. To be more concrete, the field lens 5 is configured by, in order from the light source side, a cemented lens (lens group LG1) including a negative lens (lens L1) and a positive lens (lens L2), and a positive single lens (lens L3, lens group LG2). The positive single lens (lens L3) is a planoconvex lens.

The collective lens 7 is also configured by two lens groups (lens groups LG3 and LG4) having positive power, respectively. To be more concrete, the collective lens 7 is configured by, in order from the light source side, a cemented lens (lens group LG3) including a positive lens (lens L4) and a negative lens (lens L5), and a positive single lens (lens L6, lens group LG4). The negative single lens (lens L5) is a biconcave lens. The positive power of the collective lens 7 is required to illuminate the sample surface 8 parallel to the optical axis 1. However, from the viewpoint of the correction of aberration, it is desired to largely refract light first at the side of the aperture stop 6, and not to largely refract light immediately before the sample surface 8. Therefore, the two lens groups configuring the collective lens 7 are configured by including a positive lens having the convex surface of a small radius of curvature on aperture stop (6) (light source 2) side. The convex surface of a small radius of curvature can be set on any lens in the two lens groups configuring the collective lens 7. In addition, the small radius of curvature of the convex surface can be smaller than the radius of curvature of another convex surface on the sample surface 8 side of the lens having the convex surface, or can be smaller than the radius of curvature of other convex surface on the sample surface 8 side in the two lens groups configuring the collective lens 7.

Hereinafter in this specification, the lens groups LG2, LG3, and LG4 are collectively referred to as condenser lens.

A beam 1a exemplified in FIG. 3 is a beam illuminating the end portion of the sample surface 8 through the end of the field stop 4, and regulates the illumination range. On the other hand, a beam 1b is a marginal beam on the optical axis 1, enters the sample surface 8 through the end of the aperture stop 6, and regulates the NA on the sample surface (8) side.

The illumination optical system 10 according to the present embodiment satisfies the following conditional expressions.

$$15 \geq D_{FS}/\beta \geq 9 \tag{1}$$

$$0.8 \geq NA \geq 0.5 \tag{2}$$

where $D_{FS}$ indicates the diameter of the field stop 4, $\beta$ indicates the magnification from the sample surface 8 to the field stop 4 (that is, the magnification by the field lens 5 and the collective lens 7), and NA indicates the numerical aperture on the sample surface (8) side of the illumination optical system 10.

It is more preferable that the illumination optical system 10 according to the present embodiment satisfies the following conditional expression.

$$0.5 \geq f/L \geq 0.3 \tag{3}$$

where f indicates the focal length of the condenser lens (lens groups LG2, LG3, and LG4) (that is, the composite focal length of the lens groups LG2, LG3, and LG4), and L indicates the distance from the end portion of the light source (2) side of the condenser lens (that is, the end portion of the light source side of the lens group LG2) to the sample surface 8.

Each of the conditional expressions is described below in detail.

The conditional expression (1) indicates the condition for reserving the sufficient illumination range under low magnification (for example, 20× magnification) where a larger illumination range is required. To be more concrete, the value obtained by dividing the diameter $D_{FS}$ by the magnification $\beta$ expresses the size of an image of the field stop 4 (FS) projected on the sample surface 8. Therefore, if the lower limit value of 9 of the conditional expression (1) is not reached, the sufficient illumination range is not guaranteed in the observation under low magnification because the field stop 4 cuts off the light. On the other hand, if the upper limit value of 15 of the conditional expression (1) is exceeded, for example, the field stop 4 and lenses get larger and a configuration of lenses gets complex, therefore increasing the size and manufacturing cost, etc. of the illumination optical system 10 are brought on.

The conditional expression (2) indicates the condition for reserving the sufficient resolution under high magnification (for example, 400× magnification) where a higher resolution is required. To be more concrete, it indicates the NA of the light incident on the sample surface 8. The maximum magnification covered by the illumination optical system 10 according to the present embodiment is 400×, but the NA of the objective used in the observation under 400× magnification ranges normally from about 0.65 to 0.95. On the other hand, the illumination optical system is required generally 0.8 times the NA higher than the NA of the objective. That is, an illumination optical system used along with various objectives requires the NA of 0.75 or more (about 0.95×0.8). In addition, the objective can come in various specifications, and some specifications of objectives request a smaller NA. With the conditions taken into account, when the lower limit value of 0.5 of the conditional expression (2) is not reached, a sufficient resolution cannot be obtained in the observation under high magnification even when an objective requiring a relatively small NA is used. On the other hand, when the upper limit value of 0.85 of the conditional expression (2) is exceeded, the field stop 4 and lenses get larger and a configuration of lenses gets complex, therefore increasing the size and manufacturing cost of the illumination optical system 10, etc. are brought on.

Furthermore, the conditional expression (3) indicates the condition for reserving the sufficient illumination range under low magnification (for example, 20× magnification) as with the conditional expression (1). However, the conditional expression (3) expresses the condition for reserving the sufficient illumination range with the size of the condenser lens in the direction of the optical axis taken into account. The focal length f of the condenser lens influences the projection magnification of the field stop 4 (FS). On the other hand, the distance L influences the total length of the condenser lens, and the total length of the condenser lens is normally designed to be in the predetermined range. Under the conditions above, when the lower limit value of 0.3 of the conditional expression (3) is not reached, the sufficient illumination range cannot be acquired in the observation under low magnification. If the upper limit value of 0.5 of the conditional expression (3) is exceeded, then the illumination range can be sufficiently acquired, but the condenser lens itself becomes larger and exceeds the size for the microscope.

As described above, to eliminate the necessity to operate an illumination optical system in changing the magnification between frequently used magnifications (for example, between 20× magnification and 400× magnification), it is desired to configure the illumination optical system to satisfy the conditional expression above on the sample surface 8 side from the field stop 4.

The data of the lenses of the illumination optical system 10 according to the present embodiment exemplified in FIG. 3 are listed below. Only the data on the sample surface (8) side from the field stop 4 are described.

$r_1 = \infty$  $d_1 = 85.5$  $n_1 = 1.0$
$r_2 = 117.34$  $d_2 = 4.0$  $n_2 = 1.67$  $v_2 = 32.1$
$r_3 = 40.12$  $d_3 = 12.5$  $n_3 = 1.52$  $v_3 = 64.14$
$r_4 = -57.25$  $d_4 = 37.36$  $n_4 = 1.0$
$r_5 = 65.35$  $d_5 = 6.0$  $n_5 = 1.52$  $v_5 = 64.14$
$r_6 = \infty$  $d_6 = 38.05$  $n_6 = 1.0$
$r_7 = 23.83$  $d_7 = 12.0$  $n_7 = 1.74$  $v_7 = 52.64$
$r_8 = -30.16$  $d_8 = 2.50$  $n_8 = 1.85$  $v_8 = 23.78$
$r_9 = 52.8$  $d_9 = 1.74$  $n_9 = 1.0$
$r_{10} = 20.16$  $d_{10} = 15.8$  $n_{10} = 1.74$  $v_{10} = 52.64$
$r_{11} = -42.21$  $d_{11} = 1.55$  $n_{11} = 1.0$
$r_{12} = \infty$  $d_{12} = 1.2$  $n_{12} = 1.52$  $v_{12} = 58.93$
$r_{13} = \infty$  $d_{13} = 0$  $n_{13} - 1.0$ In the data listed above, $r_1$ through $r_{13}$ respectively indicate the radius of curvature (mm) of each lens surface of the surface numbers $s_1$ through $s_{13}$, $d_1$ through $d_{13}$ indicate the interval or thickness (mm) of each lens, $n_1$ through $n_{13}$ indicate the refractive index for the d line of each lens, and $v_1$ through $v_{12}$ indicate the Abbe constant for the d line of each lens. The surface number $s_1$ refers to the field stop 4, and the surface numbers $s_{12}$ and $s_{13}$ indicate both sides of the glass slide on which a sample is placed, and the surface numbers $s_{13}$ also refers to the sample surface 8. For example, the interval $d_1$ of the lens indicates the interval or the thickness between the surface number $s_1$ and $s_2$.

In addition, in the illumination optical system 10, the focal length fg1 of the lens group LG1, the focal length fg2 of the lens group LG2, the focal length fg3 of the lens group LG3, the focal length fg4 of the lens group LG4, and the focal length f of the condenser lens are listed below.

*fg*1=94(mm)

*fg*2=126.6(mm)

*fg*3=61.1(mm)

*fg*4=20.6(mm)

*f*=27.6(mm)

In addition, the numerical aperture NA on the sample surface (8) side of the illumination optical system 10, the diameter $D_{FS}$ of the field stop 4, the magnification β from the sample surface 8 to the field stop 4, and the distance L from the end portion of the light source (2) side of the condenser lens to the sample surface 8 are listed below.

*NA*=0.8

$D_{FS}$=38(mm)

β≈3.4

*L*=78.84(mm)

The distance L is calculated as the interval from $s_5$ to $s_{13}$, and the magnification β is calculated as the ratio of the focal length fg1 of the lens group LG1 to the focal length f of the condenser lens (=fg1/f).

As described above, the illumination optical system 10 according to the present embodiment satisfies the conditional expressions (1) through (3) as confirmed respectively by the equations (C1) through (C3).

$D_{FS}/β=38/3.4≈11.18$ (C1)

*NA*=0.8 (C2)

*f/L*=27.6/78.84≈0.35 (C3)

The illumination optical system 10 configured as described above according to the present embodiment eliminates the operation of the illumination optical system in converting the magnification between frequently used magnifications (between 20× magnification through 400× magnification), thereby successfully reducing the operation load on the user of the microscope.

Embodiment 2

The illumination optical system according to the present embodiment is an example of a variation of the embodiment 1, and the shape of the lens, the interval between the lenses, etc. differ from those of the illumination optical system 10 according to the embodiment 1. Since the basic configuration is similar to that of the illumination optical system 10, only the difference from the illumination optical system 10 is described below.

As with the field lens 5 of the illumination optical system 10, the field lens 5 of an illumination optical system 20 is configured by, in order from the light source side, a cemented lens (lens group LG1) including a negative lens (lens L1) and a positive lens (lens L2), and a positive single lens (lens L3, lens group LG2). However, the field lens 5 of the illumination optical system 20 is different from the field lens 5 of the illumination optical system 10 in that the positive single lens (lens L3) is a meniscus lens. As with the collective lens 7 of the illumination optical system 10, the collective lens 7 of the illumination optical system 20 is configured by, in order from the light source side, a cemented lens (lens group LG3) including a positive lens (lens L4) and a negative lens (lens L5), and a positive single lens (lens L6, lens group LG4). However, the collective lens 7 of the illumination optical system 20 is different from the collective lens 7 of the illumination optical system 10 in that the negative lens (lens L5) is a planoconcave lens.

Figure 4:
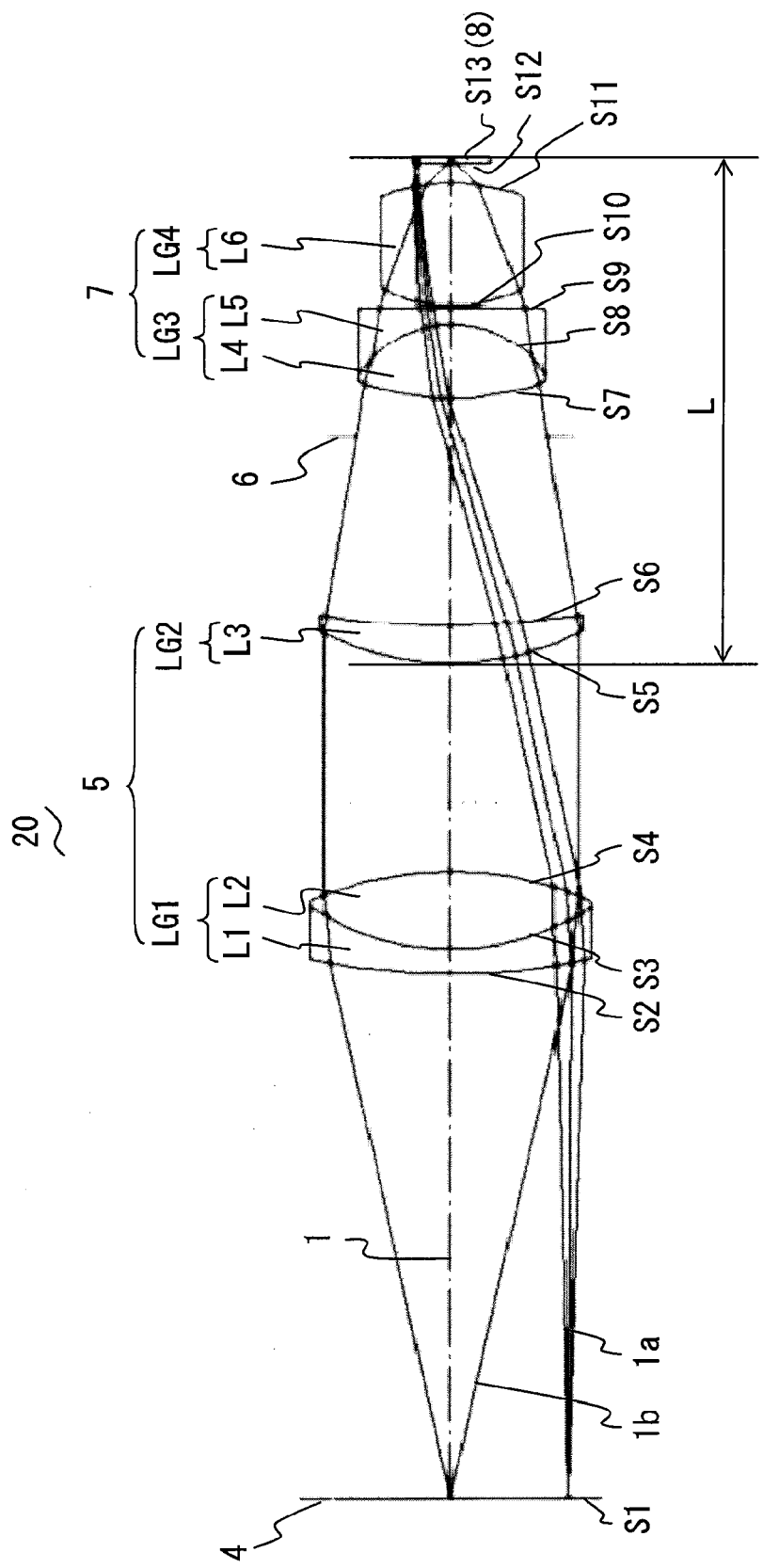
FIG. 4 exemplifies an example of a variation of the configuration of the lens of the illumination optical system according to an embodiment of the present invention.

Other configurations of the illumination optical system 20 are common with those of the illumination optical system 10 as exemplified in FIG. 2. FIG. 4 exemplifies the configuration of the lens of the illumination optical system according to the present embodiment.

The data of the lenses of the illumination optical system 20 according to the present embodiment exemplified in FIG. 4 are listed below. Only the data on the sample surface (8) side from the field stop 4 are described.

$r_1=\infty$ $d_1=85.5$ $n_1=1.0$
$r_2=117.34$ $d_2=4.0$ $n_2=1.67$ $v_2=32.1$
$r_3=40.12$ $d_3=12.5$ $n_3=1.52$ $v_3=64.14$
$r_4=-57.25$ $d_4=34.0$ $n_4=1.0$
$r_5=45.93$ $d_5=6.0$ $n_5=1.52$ $v_5=64.14$
$r_6=125.0$ $d_6=36.88$ $n_6=1.0$
$r_7=40.19$ $d_7=12.0$ $n_7=1.74$ $v_7=52.64$
$r_8=-17.82$ $d_8=2.5$ $n_8=1.85$ $v_8=23.78$
$r_9=\infty$ $d_9=0.5$ $n_9=1.0$
$r_{10}=23.31$ $d_{10}=20.0$ $n_{10}=1.74$ $v_{10}=49.34$
$r_{11}=-32.27$ $d_{11}=3.0$ $n_{11}=1.0$
$r_{12}=\infty$ $d_{12}=1.2$ $n_{12}=1.52$ $v_{12}=58.93$
$r_{13}=\infty$ $d_{13}=0$ $n_{13}=1.0$ In the data listed above, $r_1$ through $r_{13}$ respectively indicate the radius of curvature (mm) of each lens surface of the surface numbers $s_1$ through $s_{13}$, $d_1$ through $d_{13}$ indicate the interval or thickness (mm) of each lens, $n_1$ through $n_{13}$ indicate the refractive index for the d line of each lens, and $v_1$ through $v_{12}$ indicate the Abbe constant for the d line of each lens. The surface number $s_1$ refers to the field stop 4, and the surface numbers $s_{12}$ and $s_{13}$ indicate both sides of the glass slide on which a sample is placed, and the surface numbers $s_{13}$ also refers to the sample surface 8. For example, the interval $d_1$ of the lens indicates the interval or the thickness between the surface number $s_1$ and $s_2$.

In addition, in the illumination optical system 20, the focal length fg1 of the lens group LG1, the focal length fg2 of the lens group LG2, the focal length fg3 of the lens group LG3, the focal length fg4 of the lens group LG4, and the focal length f of the condenser lens are listed below.

$fg1=94$(mm)

$fg2=137.1$(mm)

$fg3=75.4$(mm)

$fg4=21.5$(mm)

$f=27.5$(mm)

In addition, the numerical aperture NA on the sample surface (8) side of the illumination optical system 20, the diameter $D_{FS}$ of the field stop 4, the magnification β from the sample surface 8 to the field stop 4, and the distance L from the end portion of the light source (2) side of the condenser lens to the sample surface 8 are listed below.

$NA=0.74$ $D_{FS}=38$(mm)

$\beta \approx 3.42$ $L=82.08$(mm)

The distance L is calculated as the interval from $s_5$ to $s_{13}$, and the magnification β is calculated as the ratio of the focal length fg1 of the lens group LG1 to the focal length f of the condenser lens (=fg1/f).

As described above, the illumination optical system 20 according to the present embodiment satisfies the conditional expressions (1) through (3) as confirmed respectively by the equations (C1) through (C3).

$D_{FS}/\beta=38/3.42\approx 11.11$ (C1)

$NA=0.74$ (C2)

$f/L=27.5/82.08\approx 0.335$ (C3)

As with the illumination optical system 10 according to the embodiment 1, the illumination optical system 20 configured as described above according to the present embodiment eliminates the operation of the illumination optical system in converting the magnification between frequently used magnifications (between 20× magnification through 400× magnification), thereby successfully reducing the operation load on the user of the microscope.

Embodiment 3

Figure 5:
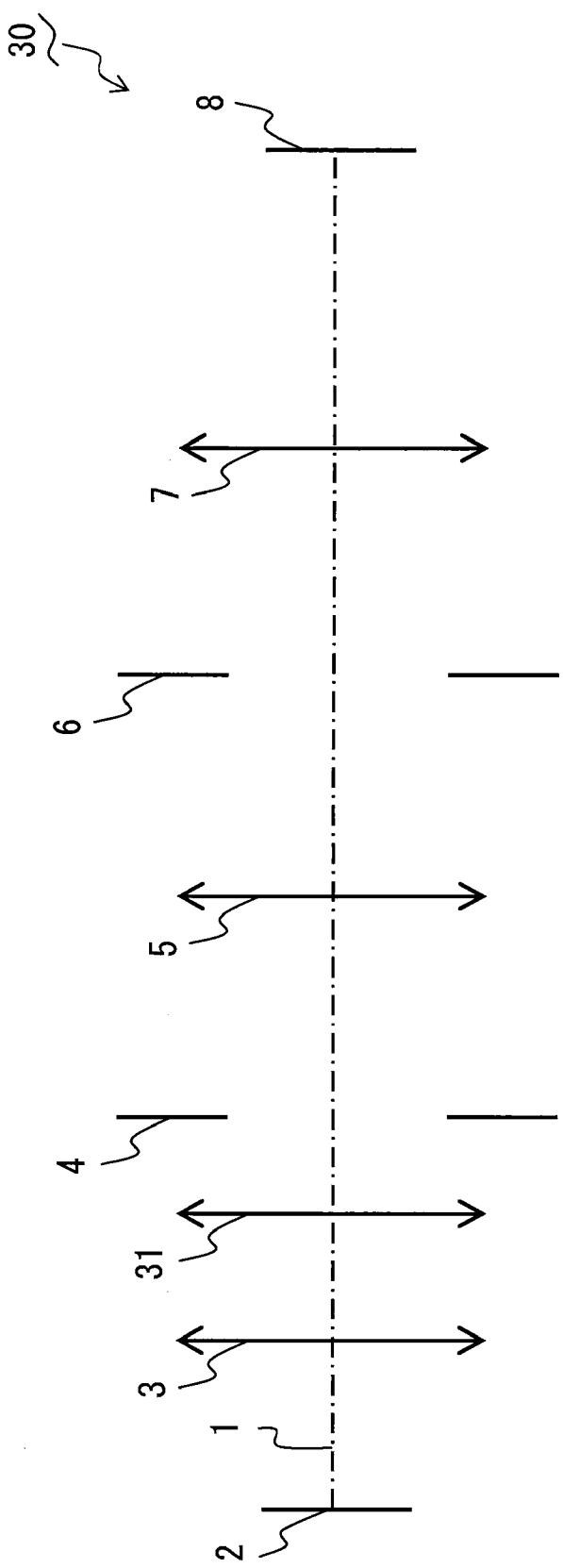
FIG. 5 illustrates the schematic view of an example of a variation of the entire configuration of the illumination optical system according to an embodiment of the present invention.

FIG. 5 illustrates the schematic view of the entire configuration of the illumination optical system according to the present embodiment. An illumination optical system 30 exemplified in FIG. 5 is different from the illumination optical system 10 in that a optical element 31 is further provided between the collector lens 3 and the field stop 4. Other configurations are common with those in FIG. 2, and the lens configuration on the sample surface (8) side from the field stop 4 is exemplified in FIG. 3.

The optical element 31 is used when the NA required in an observation under high magnification cannot be sufficiently acquired, that is, when the height of the beam that regulates the NA is too far from the optical axis. Described below is the effect of the optical element 31.

Figure 6:
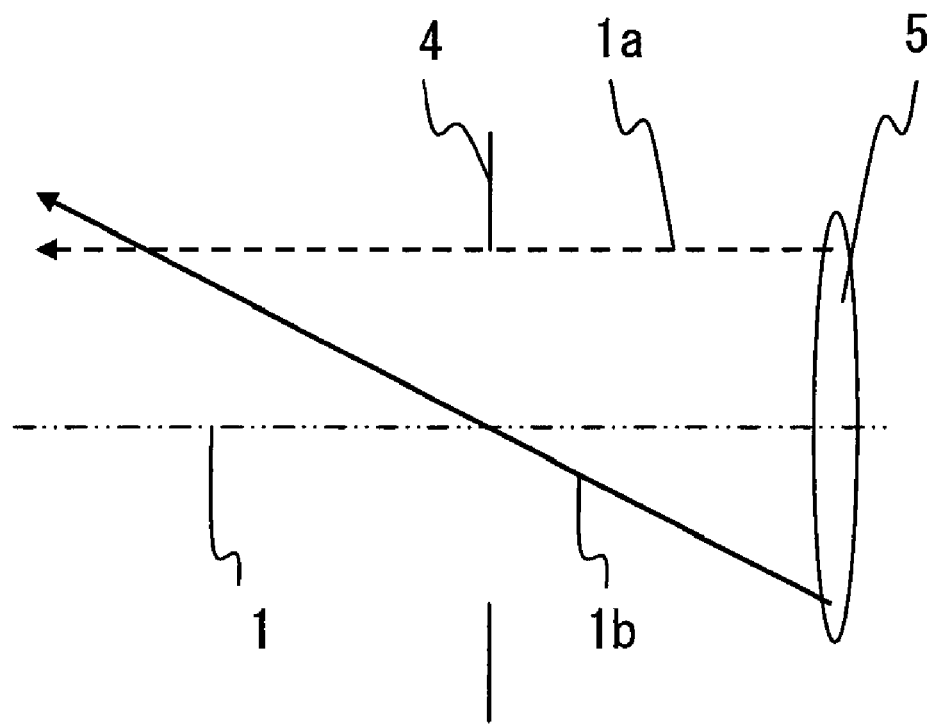
FIG. 6 is a conceptual drawing for explanation of the effect of the optical element exemplified in FIG. 5.

FIGS. 6 and 7 are conceptual drawings for explanation of the effect of the optical element exemplified in FIG. 5. FIG. 6 illustrates the case in which no optical element 31 is provided, and FIG. 7 illustrates the case in which the optical element 31 is provided. As illustrated in FIG. 7, the optical element 31 is configured by, in order from the light source side, a light diffusion element 32 and an adjusting lens 33 having positive power arranged near the light diffusion element 32. To simplify the explanation, an example is given below with reference to the case in which the beam 1a for regulating an illumination range and the beam 1b for regulating the NA are traced from the sample surface 8 to the light source 2 not illustrated in the figures.

As exemplified in FIG. 6, when the optical element 31 is not provided, the beam 1a for regulating an illumination range passes through the field stop 4 parallel to the optical axis, and reaches the light source 2 through the collector lens 3 not illustrated in the figure. On the other hand, the beam 1b for regulating the NA passes from the field lens 5 through the field stop 4 with a large angle to the optical axis 1. Therefore, if the angle is too large, the beam 1b deviates from the part within effective diameter of the collector lens 3 not illustrated in the figure, and cannot reach the light source 2. Accordingly, only a beam having a smaller angle reaches the light source 2, and a necessary NA for an observation under high magnification may not be acquired.

When the optical element 31 is provided as illustrated in FIG. 7, the beam 1a for regulating an illumination range passes through the field stop 4 parallel to the optical axis. Then, it is refracted inward by the adjusting lens 33 having positive power, and enters the light diffusion element 32 with a small angle with respect to the optical axis 1. On the other hand, the beam 1b for regulating the NA passes through the field stop 4 from the field lens 5 with a large angle with respect to the optical axis 1. Then, it is refracted inward by the adjusting lens 33 having positive power, and enters the light diffusion element 32 with a slightly smaller angle with respect to the optical axis 1. Accordingly, although the beam 1b passes through the field stop 4 with a large angle that prevents the beam 1b from reaching the light source 2 when the optical element 31 is not provided, the beam 1b can reach the light source 2 through the adjusting lens 33 and the light diffusion element 32. The light diffusion element 32 has an effect of expanding the allowable angle range of the beams capable of reaching the light source 2 by diffusing light. Therefore, by arranging the light diffusion element 32, a beam having a large angle when it passes through the field stop 4 can reach the light source 2. As far as the positions of the light diffusion element 32 and the adjusting lens 33 is concerned, it is desired that the light diffusion element 32 and the adjusting lens 33 are arranged close to each other to protect the light diffused by the light diffusion element 32 from deviating outside the optical path.

Thus, a higher NA required under high magnification can be acquired by providing the optical element 31. Furthermore to be concrete, the quantity of light of the beam 1b is acquired in exchange for a decreasing quantity of light of the beam 1a by providing the optical element 31. Thus, a higher NA required under high magnification can be acquired.

Figure 8:
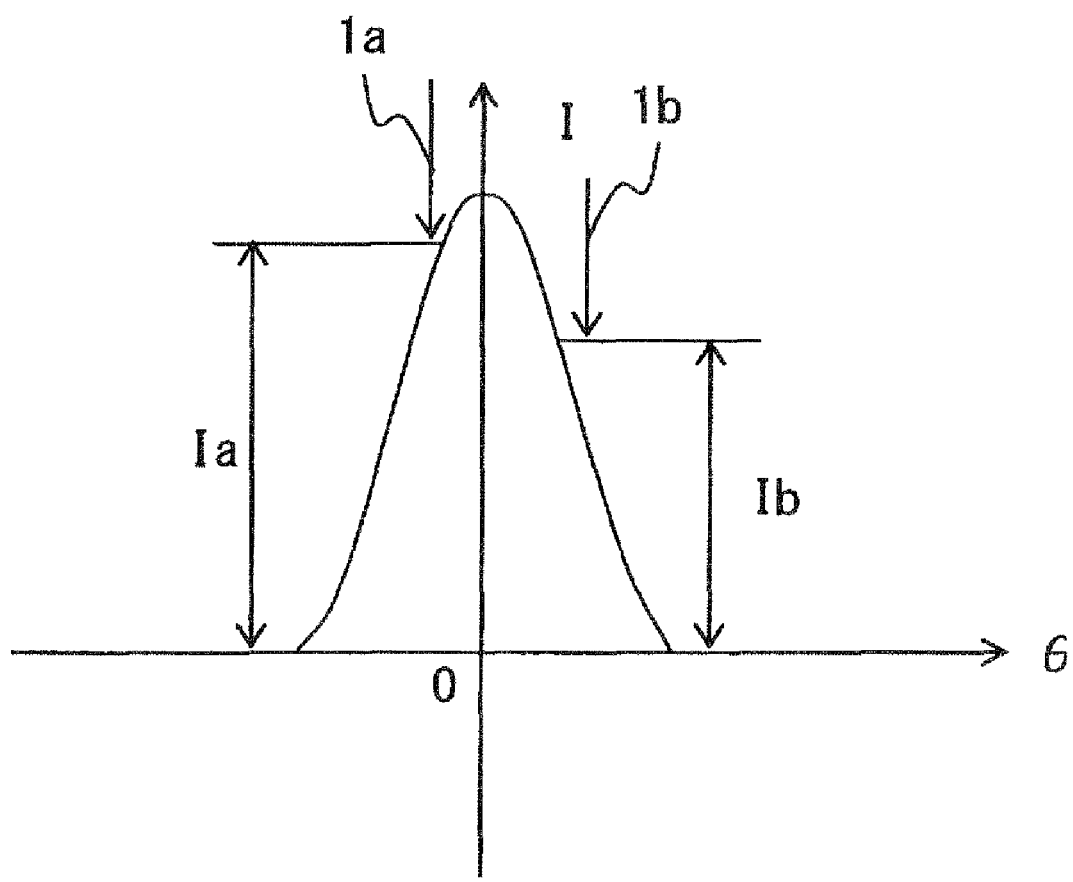
FIG. 8 exemplifies the distribution of the quantity of light to the angle made by the light and the optical axis when the light incident on the light diffusion element exits.
Figure 9:
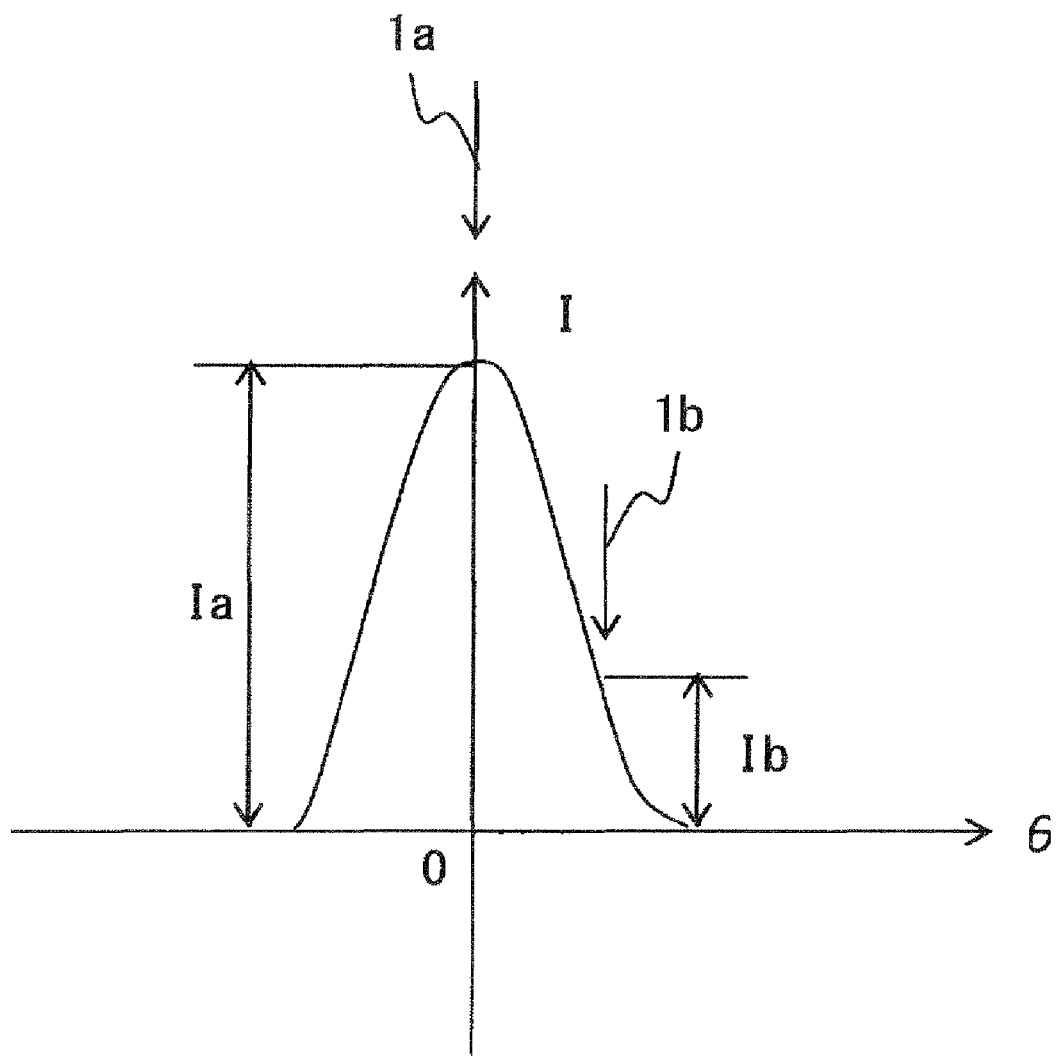
FIG. 9 exemplifies the distribution of the quantity of light to the angle made by the light and the optical axis when the light incident on the light diffusion element exits.

FIGS. 8 and 9 exemplify the distribution of the quantity of light to the angles made by the light and the optical axis 1 when the light incident on the light diffusion element 32 exits. The vertical axis indicates the quantity of emitted light, and the horizontal axis indicates the angle of the emitted light to the optical axis 1. The effect of the optical element 31 is described further in detail below with referent to FIGS. 8 and 9, with example of the light transmitted from the light source 2 to the sample surface 8.

The quantity of the light collimated by the collector lens 3 and entering the light diffusion element 32 indicates the maximum quantity when the light is emitted parallel ($\theta=0$) to the optical axis 1 as exemplified in FIG. 8, and the quantity of emitted light decreases as a larger angle is made. However, since it is necessary that the beam 1a is emitted from the light diffusion element 32 as a beam having a small angle with respect to the optical axis 1 with the refraction by the adjusting lens 33 taken into account, the light quantity Ia of the beam 1a reaching the light source 2 becomes slightly smaller than in the case in which the beam is emitted parallel to the optical axis 1. On the other hand, the beam 1b is emitted from the light diffusion element 32 as a beam having a relatively small angle with respect to the optical axis 1 with the refraction by the adjusting lens 33 taken into account and reaches the light source 2. Therefore, a certain quantity of light can be acquired as the light quantity Ib of the beam 1b.

FIG. 9 exemplifies the quantity of light of the beams 1a and 1b when the adjusting lens 33 of the optical element 31 is omitted. When the adjusting lens 33 of the optical element 31 is omitted, the beam 1a becomes parallel to the optical axis 1, thereby sufficiently reserving the light quantity Ia. Instead, since the angle of the beam 1b is not adjusted, the light quantity Ib decreases, which is not preferable in reserving a high NA as the fundamental purpose of the optical element 31.

As described above, when the effect of the adjusting lens 33 is considered, it is desired that the illumination optical system 30 satisfies the following conditional expression.

$$15 \geq f1/d \geq 2 \qquad (4)$$

where f1 indicates the focal length of the adjusting lens 33, and d indicates the distance from the adjusting lens 33 to the field stop 4.

The conditional expression (4) expresses the preferable condition of the adjusting lens 33 on the basis of the position relative to the field stop 4. To be more concrete, it indicates the adjustment level of the angle of the beam in the collector lens 3. For example, when f1/d=1, the beams emitted in most quantity from the light diffusion element 32 and parallel to the optical axis 1 are collected on the field stop 4, and the angles of the beams are excessively adjusted. Thus, when the lower limit value of 2 of the conditional expression (4) is not reached, the quantity of light of the beam 1a for regulating the illumination range cannot be acquired, and the sufficient range cannot be illuminated under low magnification. That is, as compared with FIG. 8, the beam 1b further approaches the center of the distribution, but the beam 1a greatly deviates from the center of the distribution. On the other hand, when the upper limit value of 15 of the conditional expression (4) is exceeded, the function of adjusting the angle of a beam by the adjusting lens 33 hardly works, and the quantity of light of the beam 1b for regulating the NA cannot be acquired. That is, substantially the same state as illustrated in FIG. 9 is attained, and the effect of arranging the optical element 31 is not sufficiently obtained.

In addition, when the light diffusion element 32 of the light element 31 is omitted, there is no broadening of the quantity of light with respect to the angles as exemplified in FIGS. 8 and 9. Accordingly, the light refracted by the adjusting lens 33 either reaches the light source 2 or not reaches, which is not desired from the viewpoint of reserving a high NA.

It is desired that the light diffusion element 32 of the optical element 31 has an appropriate distribution of diffusion characteristics exemplified in FIGS. 8 and 9. Practically, to suppress the loss of the quantity of light by the light diffusion element 32, it is desired that the broadening of the quantity of light exemplified in FIGS. 8 and 9 is not excessively large.

Furthermore, the light diffusion element 32 can be a diffusion plate, a microlens array, etc. When a microlens array is used, it is desired to further provide a diffusion plate on the field stop (4) side of the microlens array in addition to the microlens array. Because when an element having a large surface pattern such as a microlens array exists near the pupil, the pattern can be projected on the sample surface 8. The pattern of the microlens array can be moderated by arranging the diffusion plate between the field stop 4 and the microlens array.

As with the illumination optical system 10 of the embodiment 1 and the illumination optical system 20 of the embodiment 2, the illumination optical system 30 configured as described above according to the present embodiment eliminates the operation of the illumination optical system in converting the magnification between frequently used magnifications (between 20× magnification through 400× magnification), thereby successfully reducing the operation load on the user of the microscope.

In addition, by adding the optical element 31, an NA higher than that of the illumination optical system 10 of the embodiment 1 and the illumination optical system 20 of the embodiment 2 can be acquired.

FIG. 10 exemplifies the configuration of the microscope provided with the illumination optical system according to the embodiments 1 or 2. A microscope 40 exemplified in FIG. 10 is configured by an illumination optical system and a light source for emitting light to the illumination optical system. With the configuration, the illumination optical system has no optical element 31 exemplified in the embodiment 3, but the configuration is not limited to this configuration. That is, a microscope can comprise the optical element 31 between the collector lens 3 and the field stop 4. Thus, by providing the illumination optical system of the embodiments 1, 2, or 3, it is not necessary to perform the operation of the illumination optical system in converting the magnification between frequently used magnifications (between 20× magnification through 400× magnification), thereby successfully providing a microscope capable of reducing the operation load on the user of the microscope.

It is obvious that the present invention is not limited to the configuration exemplified according to the embodiments above, and can be varied within the scope of the gist of the present invention.

What is claimed is:

1. An illumination optical system, comprising in order from a light source side:
    a collector lens;
    a field stop;
    a field lens having positive power;
    an aperture stop; and
    a collective lens having positive power, wherein:
    the illumination optical system is a substantially both-side telecentric optical system between the field stop and a sample surface; and
    the following conditional expressions are satisfied where $D_{FS}$ indicates a diameter, in mm, of the field stop, $\beta$ indicates a magnification from the sample surface to the field stop, and NA indicates a numerical aperture on the sample surface side of the illumination optical system:

$$15 \geq D_{FS}/\beta \geq 9 \quad (1)$$

$$0.85 \geq NA \geq 0.5 \quad (2).$$

2. The illumination optical system according to claim 1, wherein:
    the collective lens comprises a lens having positive power and having a convex surface of a small radius of curvature on the aperture stop side, and
    the field lens comprises, from the light source side, at least:
        a first lens group having positive power; and
        a second lens group having positive power; and
    the following conditional expression is satisfied where f indicates a composite focal length, in mm, of the collective lens and the second lens group, and L indicates a distance, in mm, from an end portion on the light source side of the second lens group to the sample surface:

$$0.5 \geq f/L \geq 0.3 \quad (3).$$

3. The illumination optical system according to claim 1, further comprising between the collector lens and the field stop in order from the light source side:
    a light diffusion element; and
    an adjusting lens having positive power.

4. The illumination optical system according to claim 3, wherein the following conditional expression is satisfied where f1 indicates a focal length, in mm, of the adjusting lens, and d indicates a distance, in mm, from the adjusting lens to the field stop:

$$15 \geq f1/d \geq 2 \quad (4).$$

5. The illumination optical system according to claim 1, wherein the field lens comprises in order from the light source side:
    a cemented lens of a negative lens and a positive lens; and
    a positive single lens.

6. The illumination optical system according to claim 5, wherein the positive single lens is a planoconvex lens.

7. The illumination optical system according to claim 5, wherein the positive single lens is a meniscus lens.

8. The illumination optical system according to claim 1, wherein the collective lens comprises in order from the light source side:
    a cemented lens of a positive lens and a negative lens; and
    a positive single lens.

9. The illumination optical system according to claim 8, wherein the negative lens is a planoconcave lens.

10. A microscope comprising:
    an illumination optical system; and
    a light source for emitting light to the illumination optical system,
    wherein:
    the illumination optical system comprises in order from the light source side:
        a collector lens;
        a field stop;
        a field lens having positive power;
        an aperture stop; and
        a collective lens having positive power,
    the illumination optical system is a substantially both-side telecentric optical system between the field stop and a sample surface; and
    the following conditional expressions are satisfied where $D_{FS}$ indicates a diameter, in mm, of the field stop, $\beta$ indicates a magnification from the sample surface to the field stop, and NA indicates a numerical aperture on the sample surface side of the illumination optical system:

$$15 \geq D_{FS}/\beta \geq 9 \quad (1)$$

$$0.85 \geq NA \geq 0.5 \quad (2).$$

* * * * *